United States Patent [19]

Foote

[11] Patent Number: 4,994,931

[45] Date of Patent: Feb. 19, 1991

[54] ACTUATOR STRUCTURE FOR A MAGNETIC HEAD SUSPENSION ASSEMBLY IN A DISK DRIVE

[75] Inventor: Wayne E. Foote, Eagle, Id.

[73] Assignee: Hewlett-Packard Company, Palo Alto, Calif.

[21] Appl. No.: 434,662

[22] Filed: Nov. 13, 1989

[51] Int. Cl.⁵ .................... G11B 5/55; G11B 21/08; G11B 5/48; G11B 21/16
[52] U.S. Cl. ................................ 360/106; 360/104
[58] Field of Search ............... 360/106, 105, 107, 104

[56] References Cited

U.S. PATENT DOCUMENTS

| | | | |
|---|---|---|---|
| 4,116,284 | 8/1978 | Daniels | 360/106 |
| 4,131,921 | 12/1978 | Gruczelak | 360/106 |
| 4,544,972 | 10/1985 | Kogure et al. | 360/106 |
| 4,571,649 | 2/1986 | Goss | 360/106 |
| 4,716,478 | 12/1987 | Walsh et al. | 360/104 |
| 4,716,482 | 12/1987 | Walsh | 360/106 |
| 4,739,430 | 4/1988 | Manzke et al. | 360/106 |

FOREIGN PATENT DOCUMENTS

| | | | |
|---|---|---|---|
| 0696536 | 11/1979 | U.S.S.R. | 360/106 |
| 0769616 | 10/1980 | U.S.S.R. | 360/106 |

OTHER PUBLICATIONS

Design of a High Performance Rotary Positioner for a Magnetic Disk Memory–IEEE Transactions on Magnetics, vol. Mag-17, No. 4, 7/81.

Primary Examiner—John H. Wolff
Assistant Examiner—Craig Renner
Attorney, Agent, or Firm—E. F. Oberheim

[57] ABSTRACT

An actuator structure in which the arms which support the magnetic heads are of sheet material in back-to-back pairs having ends fitted into and clamped between the confronting faces of pads arranged in columns on an actuator body. The pads in each column are cantilevered from the body on deflectable supports, except for one rigid support substantially centrally positioned in each column. A bolt extending through axially aligned holes in the pads and the arms in each column applies pressure to deflect the pad supports and clamp the arms between the pads.

11 Claims, 3 Drawing Sheets

4,994,931

ACTUATOR STRUCTURE FOR A MAGNETIC HEAD SUSPENSION ASSEMBLY IN A DISK DRIVE

TECHNICAL FIELD

This invention relates generally to magnetic head suspension assemblies in a disk drive and more particularly to an actuator structure for supporting the integrated arm and flexure in such an assembly.

BACKGROUND ART

Disk memory drives generally comprise rotating magnetic memory disks, transducer heads and a linear or pivotally mounted magnetically driven actuator assembly which supports and positions the magnetic transducer heads at the disk surfaces and provides bidirectional movement of the magnetic heads over the disk or disks. Such disk memories are very high precision units requiring close dimensional tolerances in manufacturing. They are complex and delicate mechanically. In application, information stored on the disk must be accessed at high speed. This requires track seeking at high speeds and with precision. Structures such as the magnetic head suspension assemblies must be light in weight to minimize inertia yet be structurally stable and rigid while providing spring loading of the head and head mobility for track seeking and track following purposes.

Prior art magnetic head suspension assemblies as seen in the U.S. Pat. Nos. 3,931,641, 4,620,251, 4,754,353 and 4,796,122 typically comprise a rigid arm of aluminum or other lightweight material which is usually a casting of single piece or integrated construction in a disk drive involving multiple disks. These castings are provided with projecting fingers or pads to which the ends of the individual load beams or flexures which carry the magnetic heads are secured. The load beams or flexures, as the name implies, are flexible and permit spring loaded movement of the magnetic head. This movement is required in order to follow disk axial motion. Also by this means, a predetermined preloading of the magnetic head slider rails against a disk surface is provided so that at disk rotational speed the head takes off and literally flies on the thin film of air clinging to and traveling with the surface of the disk. The magnetic head is attached to the free end of the flexure or load beam by means of a thin, lightweight spring material providing flexible mobility of the magnetic head in roll and pitch and stiffness in yaw.

As will be seen by reference to these patents, the arm which supports the flexure which is either mounted for linear or angular movement is a rigid arm of aluminum or other lightweight material as described in U.S. Pat. No. 3,931,641. When viewed with respect to the flexures, it is a large bulky heavy structure constituting the bulk of the magnetic head support and is the primary contributor to a high moment of inertia of the magnetic head suspension assembly.

DISCLOSURE OF THE INVENTION

This invention provides improvements over prior art such as discussed above in the provision of a magnetic head suspension assembly which eliminates the bulky heavy arm structures such as typically provided in prior art arrangements. The magnetic head suspension assembly of this invention comprises a load beam or flexure which carries the magnetic head. This load beam or flexure is attached to one end of an arm which is stamped from thin light weight metal in a three dimensional configuration having lateral and vertical rigidity along its length as well as at its one end which is attached to the flexure. The remaining end of this arm is longitudinally slotted in laterally displaced positions adjacent opposite lateral edges and is clamped between pads on a pivotally mounted actuator bearing housing in the disclosed embodiment.

By this expedient in a rotary disk drive, the massive arm structure of the prior art devices is eliminated which significantly reduces the moment of inertia in the disclosed embodiment about the actuator axis. By reducing the mass of the arm structure, the mass which must be moved either linearly or angularly is significantly reduced which reduces the force required either angularly in a rotary disk drive or linearly in a linear disk drive to achieve high rates of movement in a magnetic head in track seeking operation. In the rotary drive depicted, the pads which clamp and support the inner ends of the arms of the magnetic head suspension assembly are located at the surface of the actuator bearing housing. Thus all massive structure in this arrangement has a very short moment arm with respect to the rotary actuator bearing housing axis, minimizing the moment of inertia.

Structure of this general type is described in detail in a copending application of Wayne E. Foote, et al Ser. No. 07/434,749, filed Nov. 13, 1989, the same day as this application, entitled "Magnetic Head Suspension Assembly In A Disk Drive" and assigned to the assignee of this invention. Subject matter of this referenced application is incorporated herein in its entirety by reference thereto.

The actuator structure of this magnetic head suspension assembly comprises a body having cantilevered pads aligned in spaced end-to-end relationship in separate parallel columns in which the confronting pad faces define slots into which the ends of the arms are fitted. The pads have aligned holes along the axis of each column through which a bolt is fitted. A cantilevered web supporting a substantially centrally positioned pad in each column is sufficiently thick to be inflexible or rigid. The cantilever webs supporting the pads on each side of the substantially central pad in each column are of a thickness to permit slight deflections so that under bolt pressure the pads carried thereby may be displaced in a direction toward the substantially central pad. When the bolt is tightened, the pads in a column are displaced clamping the ends of the arms between and against the faces of the pads which secures the arms.

BEST MODE FOR CARRYING OUT THE INVENTION

Figure 1:
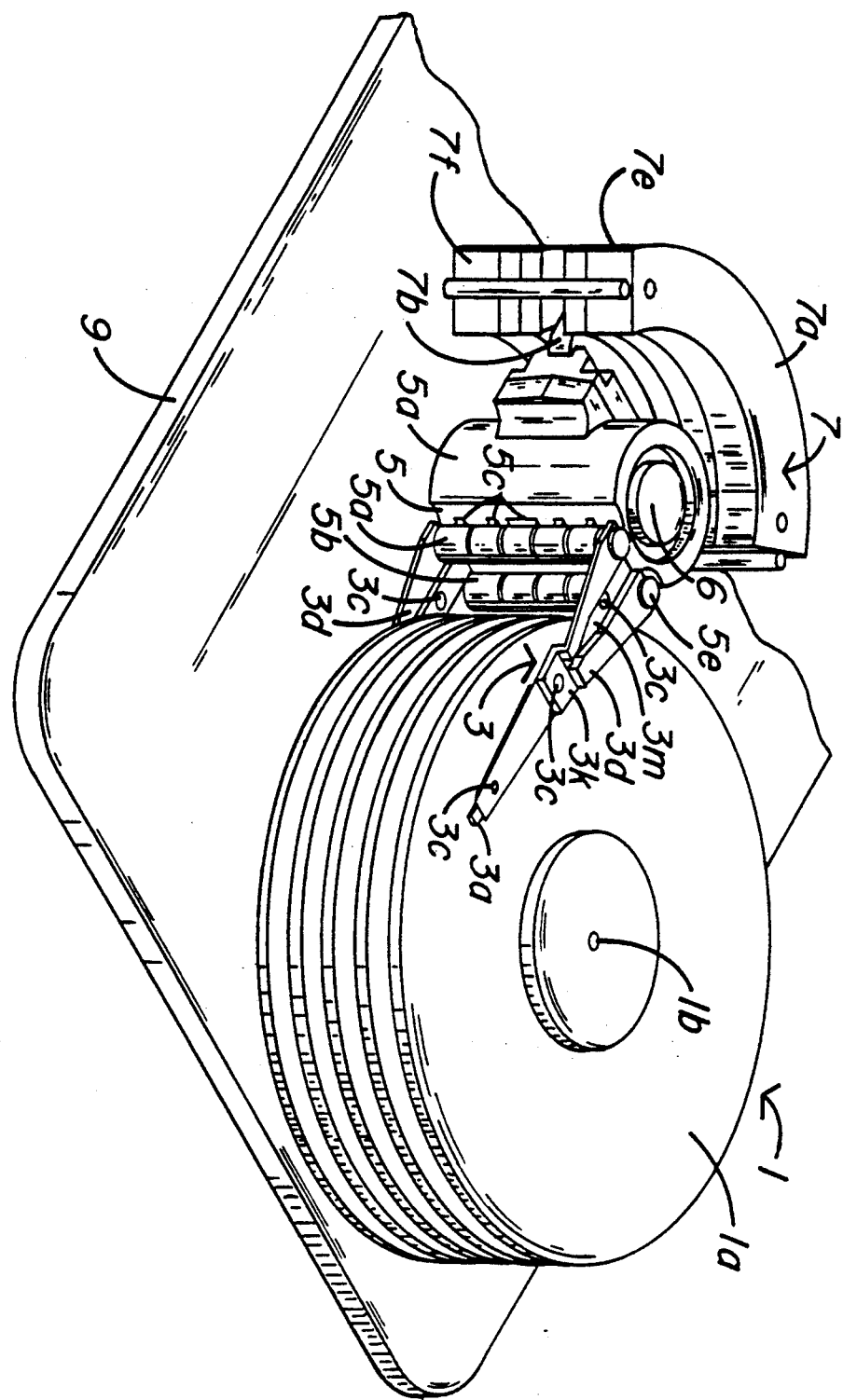
FIG. 1 is a perspective view of a portion of a rotary disk memory drive embodying the principles of this invention.

FIGS. 1-4 illustrate the details of a presently preferred embodiment of this invention. Referring now to FIG. 1, there is illustrated a rotary disk memory drive comprising a magnetic disk assembly 1 having individual disks 1a adapted to be driven by a motor (not shown). Such a magnetic disk assembly will be rotated at a constant speed. The actuator structure of this invention is part of a major functional assembly in a disk drive, here depicted as a rotary disk drive, which comprises a magnetic head suspension assembly 3, an actuator structure in the form of a rotary actuator bearing housing 5, and a magnetic drive 7. The rotary actuator bearing housing 5 is journalled on a spindle 6 which is attached to a base plate 9. Other structural features of this disk drive believed not to be essential to an understanding of this invention are not illustrated in the interest of simplicity.

Figure 2:
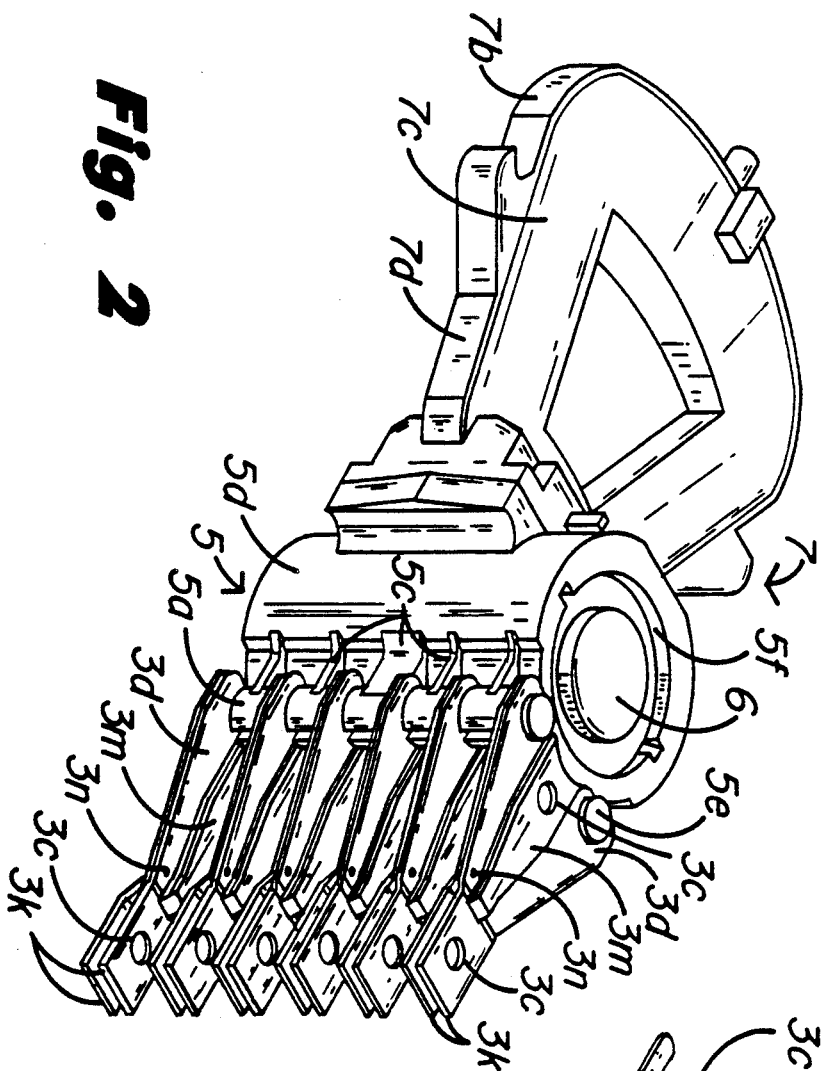
FIG. 2 is an enlarged perspective view of the rotary actuator assembly of FIG. 1, without the flexures and magnetic heads showing the arms attached to the rotary actuator bearing housing.

The actuator bearing housing 5 is provided with two columns 5a and 5b of mounting pads which mount the individual magnetic head suspensions 3. These two columns are slotted laterally in the same plane in plane positions intermediate the planes of the memory disks of the disk assembly 1. The confronting faces of these mounting pads, that is the width of the individual slots, is sufficient to receive two magnetic head suspension assemblies 3 in back-to-back relationship as seen in FIG. 2. The fit is a sliding fit providing a slight friction interference. When fitted in the slots, the magnetic head suspension assemblies 3 position the magnetic heads between the disks. The flexures and the magnetic heads mounted thereon are not shown in this illustration in the interest of simplicity, however in FIG. 3, one such magnetic head suspension assembly is illustrated.

The actuator bearing housing 5 comprises a cylindrical body 5d. The cylindrical body 5d is provided with a bearing bore 5f in which the bearing assembly (not shown) on the spindle 6 is adhesively fixed.

Figure 3:
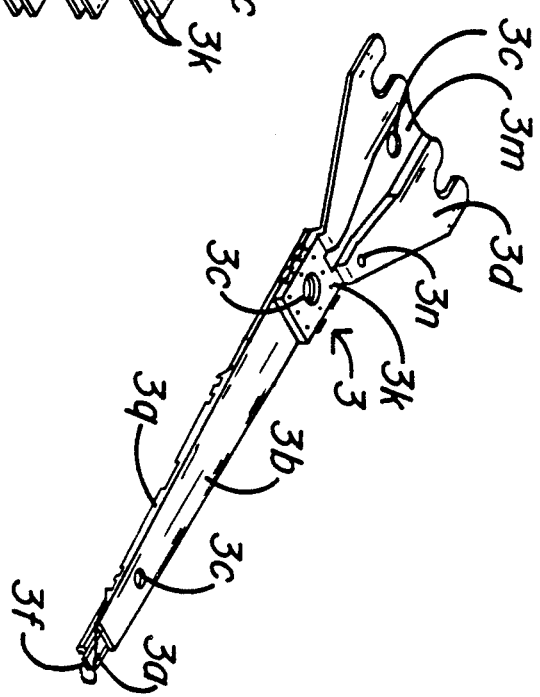
FIG. 3 is an enlarged perspective view of the integrated arm and flexure of one magnetic head suspension assembly.

Each integrated arm and flexure assembly comprises a flexure 3b and an arm 3d of sheet material. The assembly shown in FIG. 3 is for a downwardly facing head. The arm 3d is provided with a pad 3k which as viewed is displaced downwardly from the surface of the remaining portion of the arm. The flexure, or load beam 3b is attached to the bottom face of the pad 3k and is preferably secured thereto by means of laser spot welding. Dimensional stability in the remaining portion of the arm 3d together with structural rigidity is achieved by displacing the central portion 3m of the surface of the arm 3d. A dimple 3n (FIGS. 2 and 3) is displaced upwardly from the surface of the arm 3d. The magnetic head suspension assemblies for the upward facing and downward facing magnetic heads are as shown in FIG. 3 and are identical except for the routing of the conductor along the opposite sides of the arm 3d (not shown). By these expedients, when the magnetic head suspension assemblies with the oppositely routed wires are disposed in engaged back-to-back relationship, the conductors lie on the same side of the magnetic head suspension assembly stack. The dimples 3n in this position are laterally disposed and function to provide adequate displacement at the mounting pads 3k.

Figure 4:
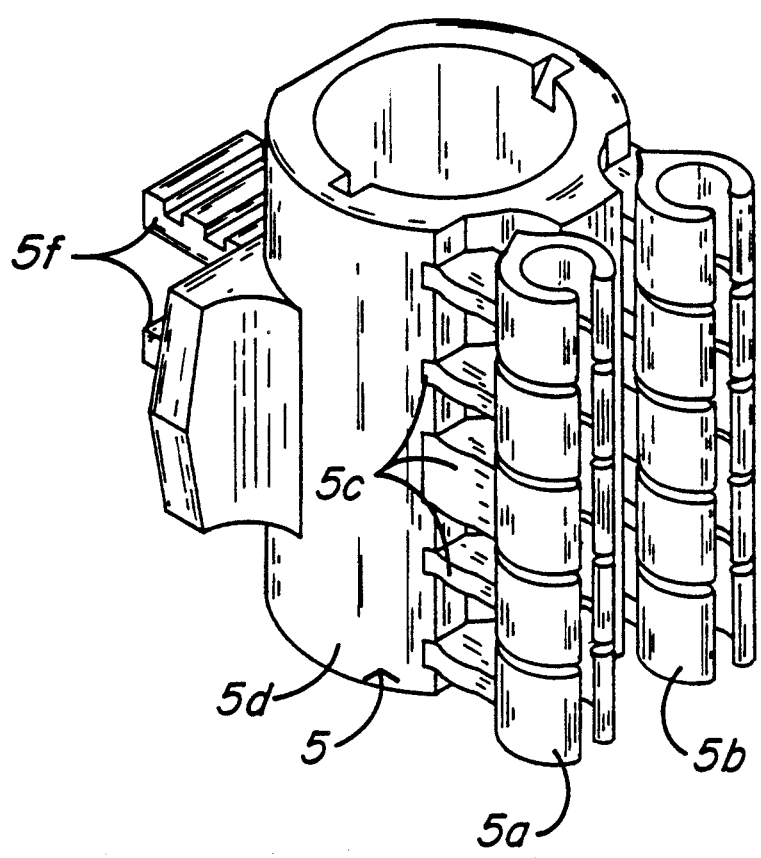
FIG. 4 is an enlarged perspective view of the actuator bearing housing of this invention.

As seen in FIGS. 2 and 4, the individual pads of the columns 5a and 5b are attached to the cylindrical body 5d of the actuator bearing housing by means of cantilever webs 5c, which, except for the center-most of these webs, are deflectable. Bolts 5e extending through axially aligned holes in the pads in the columns of pads 5a and 5b when tightened apply pressure longitudinally of the columns of the pad in each column. The longitudinal bolt force displaces the pads longitudinally of the columns in a direction towards the center-most pads. This deflects the cantilever webs 5c which attach the pads to the actuator bearing housing 5d. By this means the inner ends of the magnetic head suspension assemblies are securely clamped between the pad faces to the cylindrical body of the actuator bearing housing.

Prior to tightening of the bolts 5e, alignment rods (not shown) are inserted through the corresponding holes 3c which are in the flexures 3b and the arms 3d. This precisely aligns the magnetic head suspension assemblies minimizing, if not completely eliminating, unwanted relative lateral and longitudinal displacement of the magnetic heads during assembly, providing precise magnetic head alignment when the bolts 5e are tightened and the assembly completed, at which time the alignment rods are removed. This provides improved mounting tolerances for the arms since the outer pads will be forced towards the stiffer central pad. The cantilever sections provide flexibility for clamping but high stiffness longitudinally of the arms. High longitudinal stiffness is required for high performance disk drive actuators whether of the rotary or linear type. In a preferred embodiment of this invention, the hub is made from stainless steel using a metal injection molding process which is well known. Only a small amount of additional machining is required after molding to cut the slots in the pad columns to define the individual pads and to ream the bearing bore 5f. Since the flexure 5b and the arm 5d are of stainless steel, stainless steel is also used in the hub to provide a thermal expansion coefficient match throughout the head suspension assembly and with the bearing assembly. Thermal expansion mismatches over a period of time are a leading cause of disk drive head misalignment and resulting head tracking errors.

As seen in FIGS. 1 and 2, the actuator rotor 7b is secured to the actuator bearing assembly 5 in a position diametrically opposite to that of the mounting pads of columns 5a and 5b. The rotor 7b swings in an arc about the axis of the spindle 6 between the confronting faces of the arcuate permanent magnets 7e and 7f. The rotor 7b comprises a bobbin 7c within which a coil (not shown) is wound. The coil is sealed within the bobbin 7c by means of a peripheral enclosure 7d. The direction of movement of the rotor 7b between the arcuate permanent magnets 7e and 7f is controlled by the application of direct current to the coil of one polarity or the reverse.

Although the invention has been illustrated with respect to a rotary type of actuator, it will be clear to those skilled in the art that the principles of this invention can be applied equally to linear disk memory drives in which case the columns of pads 5a and 5b will be attached by the cantilever webs 5c to the actuator structure of a linear drive. In such an installation, the mounting pads may be similarly structured and mounted. The arm and flexures may be similarly integrated and fabricated and configured, and the attachment thereof to the actuator structure in the slots provided by the pads in the individual pad columns where they are retained by clamping pressures provided by bolts 5e, may be identical to that disclosed for the rotary actuator herein.

Stainless steel may also be advantageously employed in such a linear actuator structure to minimize differences in thermal expansion coefficients which are detrimental to magnetic head positioning.

INDUSTRIAL APPLICABILITY

This actuator structure as part of a magnetic head suspension assembly is generally useful in all disk memory drives whether of the rotary or linear actuator type.

What is claimed is:

1. An actuator structure for a magnetic head suspension in a disk memory drive, comprising:
    an actuator body:
    a plurality of mounting pads having holes therethrough;
    cantilever support means comprising a deflectable cantilever support for at least some of said pads, joining said pads to said body in longitudinally spaced end-to-end positions with the holes aligned, in pad positions defining two laterally spaced columns of pads on said body, the longitudinal spacing of said pads defining slots therebetween, corresponding slots in the respective columns occupying positions in the same plane;
    a plurality of arm structures of sheet material for individually supporting a magnetic head, disposed in back-to-back relationship in pairs with corresponding ends of said pairs having width straddling said columns and fitted into corresponding slots in said columns, laterally spaced openings in said ends being aligned with said holes in said pads; and
    an elongated member extending through said holes in said pads in each column for applying a force to the end pads of each column directed inwardly of each column to deflect said cantilever supports which are deflectable and clamp said ends of said arm structures between said pads.

2. The actuator structure according to claim 1, in which one cantilever support of said cantilever support means in each column is rigid cantilever support.

3. The actuator structure according to claim 2, in which:
    said one cantilever support in each column is disposed substantially centrally therein.

4. The actuator structure according to claim 1, in which:
    said actuator body, pads, cantilever support means and arm structures are of materials having nearly the same thermal coefficients.

5. The actuator structure according to claim 1, in which:
    said actuator body, said pads and said cantilever support means are integral.

6. The actuator structure according to claim 1, in which:
    said actuator body, pads, cantilever supports and arm structures are of the same material.

7. The actuator structure according to claim 6, in which:
    said actuator body, pads, cantilever supports and arm structures are of stainless steel.

8. The actuator structure according to claim 1, in which:
    said actuator body is pivotally mounted for angular movement about an axis paralleling said at least two columns of pads.

9. The actuator structure according to claim 8, in which:
    said actuator body is a cylindrical body and said least two columns of pads are supported in circumferentially spaced positions adjacent the cylindrical surface of said cylindrical body by said cantilever supports.

10. The actuator structure according to claim 1, comprising:
    motor means connected to said actuator body for moving said actuator structure.

11. The actuator structure according to claim 9, comprising:
    motor means connected to said cylindrical body for angularly displacing said cylindrical body.

* * * * *